H. B. SCHOLES & J. HAUGHIAN.
COUCHING CHAMBER FOR MALTING.

No. 259,591. Patented June 13, 1882.

Witnesses:
E. J. Rice
John L. Jones

Inventors:
James Haughian
Henry B. Scholes

UNITED STATES PATENT OFFICE.

HENRY B. SCHOLES AND JAMES HAUGHIAN, OF BROOKLYN, NEW YORK.

COUCHING-CHAMBER FOR MALTING.

SPECIFICATION forming part of Letters Patent No. 259,591, dated June 13, 1882.

Application filed September 22, 1879.

*To all whom it may concern:*

Be it known that we, HENRY BRIDE SCHOLES and JAMES HAUGHIAN, both residents of the city of Brooklyn, county of Kings, and State of New York, have invented certain new and useful Improvements in the Construction of Couching Rooms or Chambers for Malting, of which the following is a specification.

The treatment known as the "couching," "sweating," and "flooring" of malt is one that requires great care on account of a necessity of preserving a uniform temperature in the chamber where it is conducted during the term required for its treatment—a temperature not below 50° and not above 60° Fahrenheit.

Our improvements relate to the use of water to regulate the temperature of the air in such chambers and the air supplied to such chambers, so that the desired temperature may be at all times preserved in the couching-chambers at that degree most favorable for this process. Such chambers may be constructed with double walls to protect the malt from the changes of temperature continually taking place outside, or with single walls, or in any usual manner; and the invention therein consists in supplying air to the chambers at the temperature desired by providing said chambers with a water-tank projecting above and slightly below its ceiling, with inclosed vertical air-pipes open at each end and extending through said water-tank, whereby the air supplied from the outside is cooled in its passage through such pipes and discharged by gravity directly into such couching chamber or chambers, all as more fully hereinafter explained and claimed.

Figure 1:
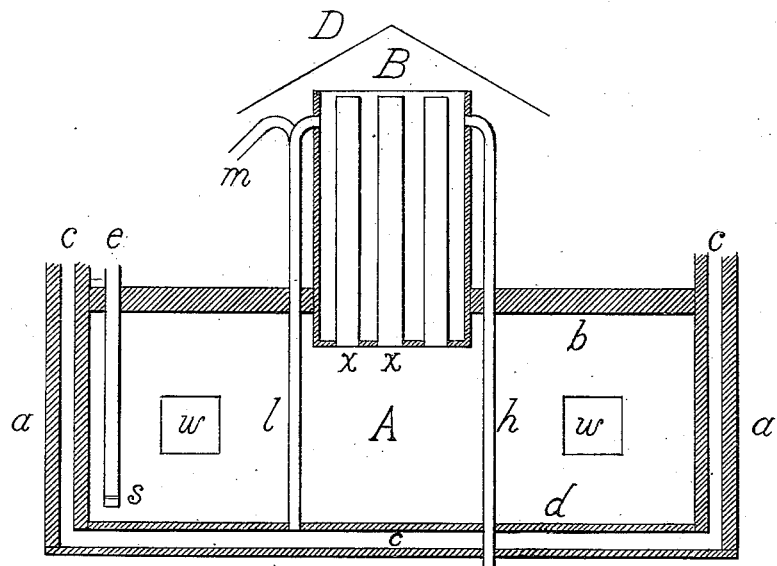
Figure 2:
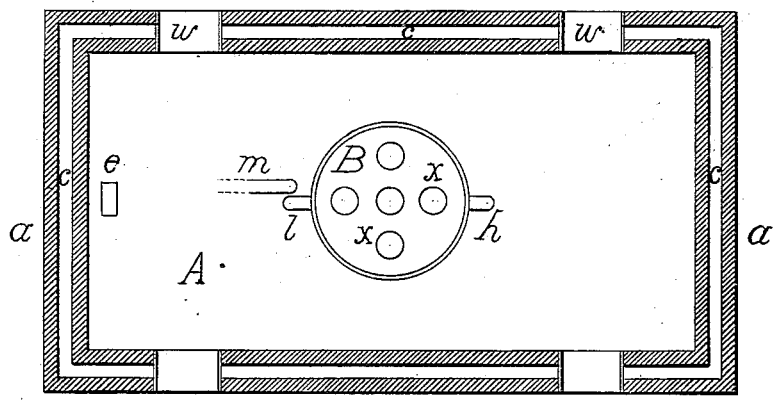

In the drawings, Figure 1 represents a vertical section of a couching-chamber arranged to be kept at the desired temperature by the use of water, when outside it is very warm, and when it is necessary to keep the air of the chamber cooler than the outside temperature; and Fig. 2 represents a plan view.

In the drawings, A represents the chamber; $a\ a$, the walls, which are shown as double walls; $b$, the ceiling; $d$, the floor; $w\ w$, windows; $c\ c$, spaces for water below the floor and between the exterior and interior walls; $e$, a ventilating tube or shaft; $s$, a slide or register; B, a section of the water-tank set or secured so as to project above and slightly below the ceiling; $x\ x$, air-tubes open at each end and passing vertically through the water-tank for supplying air to the chamber; $h$, a pipe to supply the tank with water; $l$, a circulating-pipe to connect the tank with the water-receptacles below the floor and between the walls or about the room; $m$, a waste-pipe; D, a hood or roof above the water-tank to protect the air-pipes. This hood may be raised or lowered by any suitable means to regulate the passage of the air through the pipes into the chambers.

The water-tank may be open at the top, as shown, or closed. In this arrangement, designed for a hot climate or for warm weather, the water should be fed to the tank B by the supply-pipe $h$, by a pump, or otherwise, at a temperature below that desired for the chamber—for example, at about 40° Fahrenheit. The water will fill the tank and the water-receptacles connected with the tank by the pipe $l$, and the surplus water will pass off at the waste-pipe $m$, which may take the water from below the floor, as shown, or from the top of the water-spaces about the room, and discharge it at a point near the level of the point of supply.

The air in the tubes $x\ x$, which pass through the tank, will be cooled by the water in the tank about the tubes, and by gravity will settle or fall into the chamber A below.

By a proper adjustment of the slide or register of the ventilating tube or shaft $e$ a circulation of air through the chamber will be produced by way of the air-tubes $x\ x$ and through the ventilating-shaft $e$, and the temperature of the chamber will soon be reduced to the required degree.

By regulating the quantity and the temperature of the water fed to the tank B the temperature of the chamber may be kept at the desired degree as long as may be required.

Ordinarily the tank B, arranged as shown, for the purpose of supplying air to the chamber of the required temperature, will be sufficient to accomplish the result desired without the use of water-receptacles below the floor and about the room, as shown. In that case the pipe $l$ could be made the waste-pipe to carry off the surplus water. It is obvious, however, that the circulation of the water about the room, as shown, would aid and facilitate in keeping the temperature of the chamber uniform at the required degree.

When the temperature outside the chamber is below the temperature desired the arrangement of the tank B, as shown, for supplying air to the chamber could not be used to advantage, and then the air-pipes $x$ $x$ should be closed. In such case (in cold weather or in cold climates) the air of the chamber may be heated to the desired degree by the use of water a little warmer than the temperature desired. For that purpose the tank B should be closed at the top and should be set at or below the floor of the chamber. The air in the tubes $x$ $x$, heated by the water in the tank, would then pass up into the chamber by proper connections with the tank B. A circulation of warm water about the room could then be had through the water-spaces $c$ $c$, the supply and and waste pipes being carried up to the height at which the water is desired to rise.

Thus in all climates and at all seasons couching-chambers may be kept in that condition of temperature which is most favorable for malting.

Being aware of the fact that chambers have heretofore been provided with a cooler located in the upper portion thereof and containing vertical air-pipes open at both ends, and that it is old in the art to surround the walls of a couching-chamber with water, and also old to lower the temperature of a chamber by injecting air into the same through a range of pipes immersed in a cooling-liquid, we therefore do not wish to broadly claim such; but

What we claim, and desire to secure by Letters Patent, is—

The combination, with a couching-chamber for malting, having a water-space between its walls and under its flooring, and provided with a water-tank projecting above and slightly below its ceiling, with inclosed vertical air-pipes open at each end and extending through said water-tank, of pipes connecting with said tank, whereby it is filled with water and the surplus thereof discharged into the space surrounding such couching-chamber, substantially as and for the purpose set forth.

HENRY B. SCHOLES.
JAMES HAUGHIAN.

Witnesses:
EDWIN T. RICE,
JOHN L. JONES.